United States Patent [19]
Cobb et al.

[11] Patent Number: 4,958,903
[45] Date of Patent: Sep. 25, 1990

[54] SPLICE CLOSURE

[75] Inventors: Gary S. Cobb, Norcross; Phillip M. Thomas, Lake City, both of Ga.

[73] Assignee: AT&T Bell Laboratories, Murray Hill, N.J.

[21] Appl. No.: 282,811

[22] Filed: Dec. 9, 1988

[51] Int. Cl.[5] .......................... G02B 6/36; G02B 7/26
[52] U.S. Cl. ................................................. 350/96.20
[58] Field of Search ................ 350/96.20, 96.21, 96.22

[56] References Cited
U.S. PATENT DOCUMENTS

| | | | |
|---|---|---|---|
| 4,752,110 | 6/1988 | Blanchet et al. | 350/96.20 |
| 4,761,052 | 8/1988 | Buekers et al. | 350/96.20 |
| 4,776,662 | 10/1988 | Valleix | 350/96.20 |
| 4,790,648 | 12/1988 | Ohta et al. | 350/96.20 |
| 4,805,979 | 2/1989 | Bossard et al. | 350/96.20 |
| 4,812,004 | 3/1989 | Biederstedt et al. | 350/96.20 |

Primary Examiner—William L. Sikes
Assistant Examiner—Robert E. Wise
Attorney, Agent, or Firm—Charles E. Graves

[57] ABSTRACT

A design for an underwater splice closure is disclosed that protects splices essentially independent of operating depth, while allowing for ease of use and low-cost manufacture. The primary splice housing consists of an upper and a lower half-cast of beryllium copper. The splices are made and then organized along a series of interior trays mounted from risers attached to the lower half of the housing. The two halves bolt together. An end-seal assembly contained on the lower half of the closure, and consisting of a series of O-ring applications, receives the sheathed cable and directs it to a mounting means which secures the sheath to the lower half of the splice closure. The invention is particularly adapted to optical fiber splice closures which require protective fill.

6 Claims, 3 Drawing Sheets

007
SPLICE CLOSURE

FIELD OF THE INVENTION

This invention relates to communications cable splice closures, and particularly to closures intended for use in hostile or potentially corrosive environments such as deep water.

BACKGROUND OF THE INVENTION

Many underwater telecommunications splice closures of the prior art currently do not sufficiently safeguard the splice zone from water incursions or from contaminants that may be present in the operating environment. Various closure designs and mechanisms are in use currently for preventing the adverse effects of water incursions into a splice zone, for example; but these typically are not sufficiently robust to withstand for long periods the water pressures at today's installed operating depths.

Designs in use typically also are unduly complex mechanically, particularly for use as underwater repair splice closures. Those which are physically robust tend to be expensive to manufacture, or require inordinate amounts of time to use in practice.

Optical fiber communications media are finding increasing use in the current outside plant. With this comes a need for more efficient and low cost splice closures to house optical fiber splices, while at the same time protecting the splices from the serious degradation of contaminants in the operating ambient.

OBJECTS OF THE INVENTION

Accordingly, one object of the invention is to provide a splice closure which is at once physically robust and less expensive than present splicing technology provides.

Another object of the invention is to provide an underwater telecommunications splice closure which facilitates the completion of cable splices in the field, both at installation time and during necessary repairs.

A specific object of the invention is to provide an underwater optical fiber splice closure which reliably and inexpensively assures against the incursion of water into the closure interior.

SUMMARY OF THE INVENTION

A design for an underwater splice closure is disclosed that protects splices essentially independent of operating depth, while allowing for ease of use and low-cost manufacture. The primary splice housing consists of an upper and a lower half cast of beryllium copper. The splices are made and then organized along a series of interior splice-containing trays mounted from risers attached to the lower half of the housing, which locate the trays substantially into the interior of the upper housing.

The two housings bolt together. An end seal assembly contained on the lower half of the closure, and consisting of a series of O-ring applications, receives the sheathed cable and directs it to a mounting means which secures the sheath to the lower half of the splice closure. The invention is particularly adapted to optical fiber splice closures which require protective fill.

The cable typically is filled for underwater protection with a grease or jelly. To extend the protective grease fully, the upper half of the closure includes access ways in which fill material is introduced. Once the splices are completed, the entire splice closure interior is filled. Air is vented to avoid pockets which could allow space for water. The two reservoirs of fill physically meet and merge to form a single, continuous filler which essentially prevents any pressure differential to occur between the interior of the closure and the exterior water body. As a result, no outside contaminants can enter the closure, thus ensuring a longer life for the splices cable.

DETAILED DESCRIPTION OF AN ILLUSTRATIVE EMBODIMENT

Figure 1:
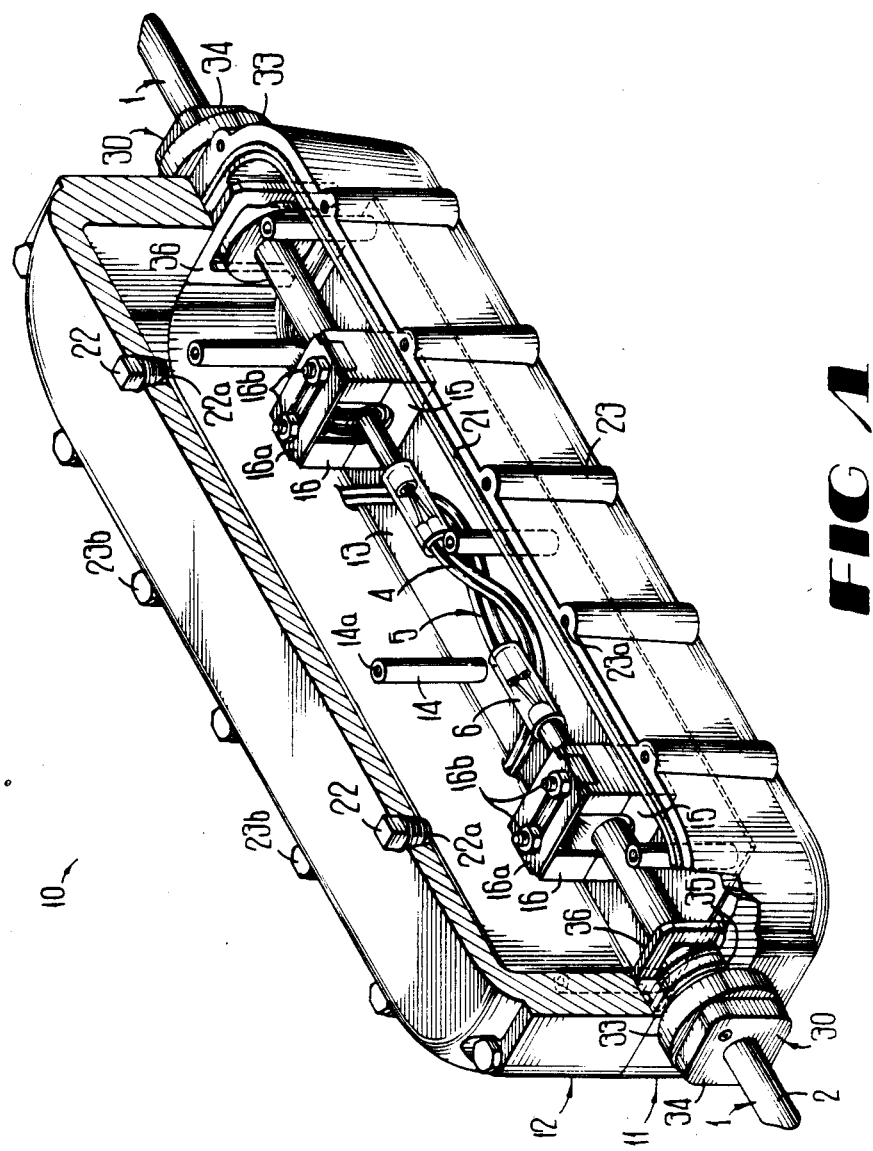
FIG. 1 is an isometric view in partial cutaway showing the assembled closure with an optical fiber cable termination.

The closure 10 is seen in FIG. 1 as consisting of a lower housing 11 and an upper housing 12. Two sections of an optical fiber cable, denoted 1, enter the closure 10 through end seal assemblies 30. The cable sections anchor to respective cable grips consisting of lower and upper blocks 15, 16. Groups of optical fibers 4, 5 placed in protective tubing 6, feed from the cable section ends into organizer trays 20.

Figure 2:
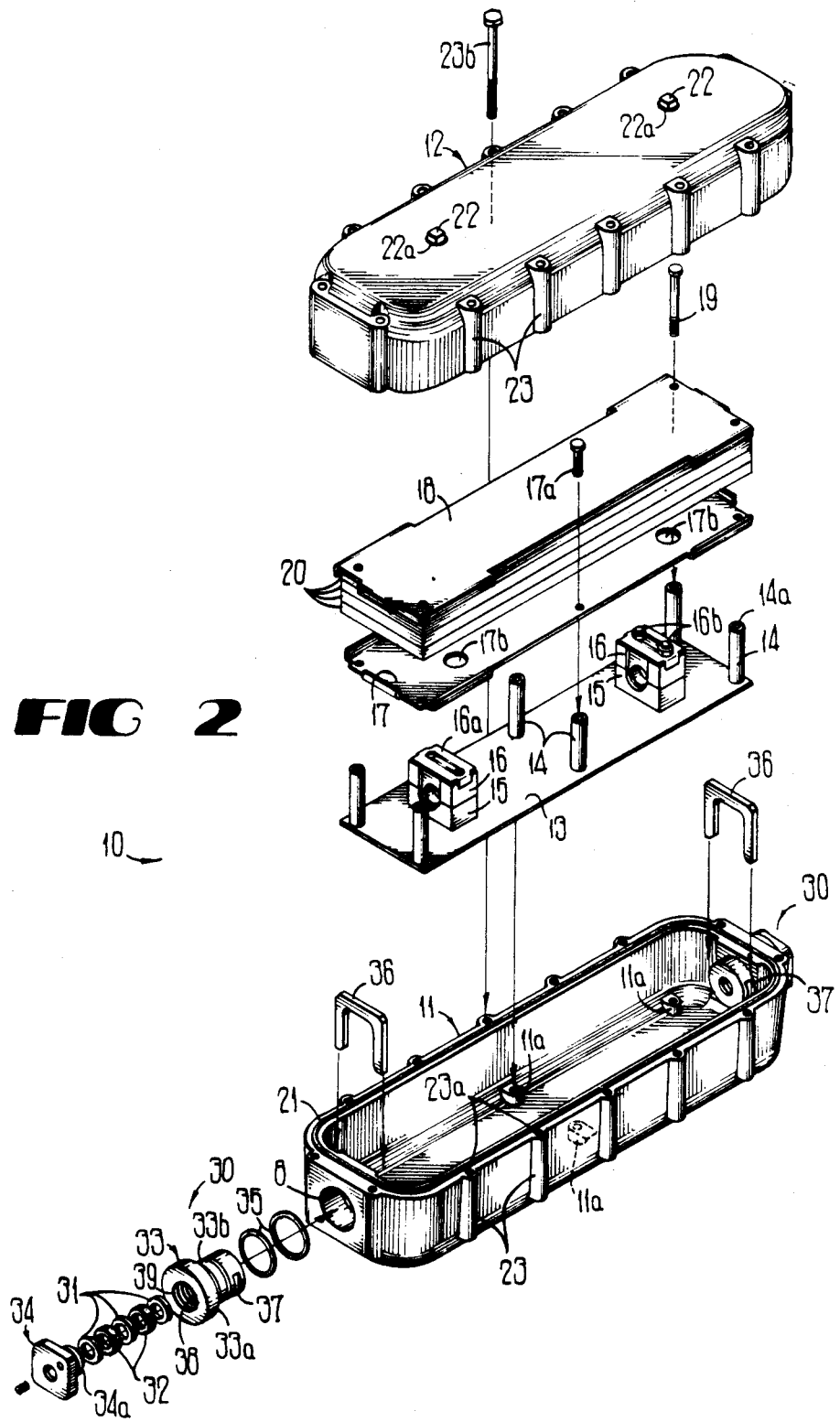
FIG. 2 is an exploded view of the main inventive components of the splice closure.

The structural and functional concepts of the splice closure are more specifically revealed in FIG. 2. The two housing 11, 12 of the closure advantageously are castings of beryllium copper, each strengthened with a ring of side ribs 23 with bolt passages, which are formed in lower housing 11 with threaded holes 23a. A gasket 21 seats on the interior flanges of the housing 11, 12. Bolts 23b access the holes 23a through the ribs of the upper housing 12 and in conventional fashion tightly fasten and align the two housing 11, 12.

Figure 3:
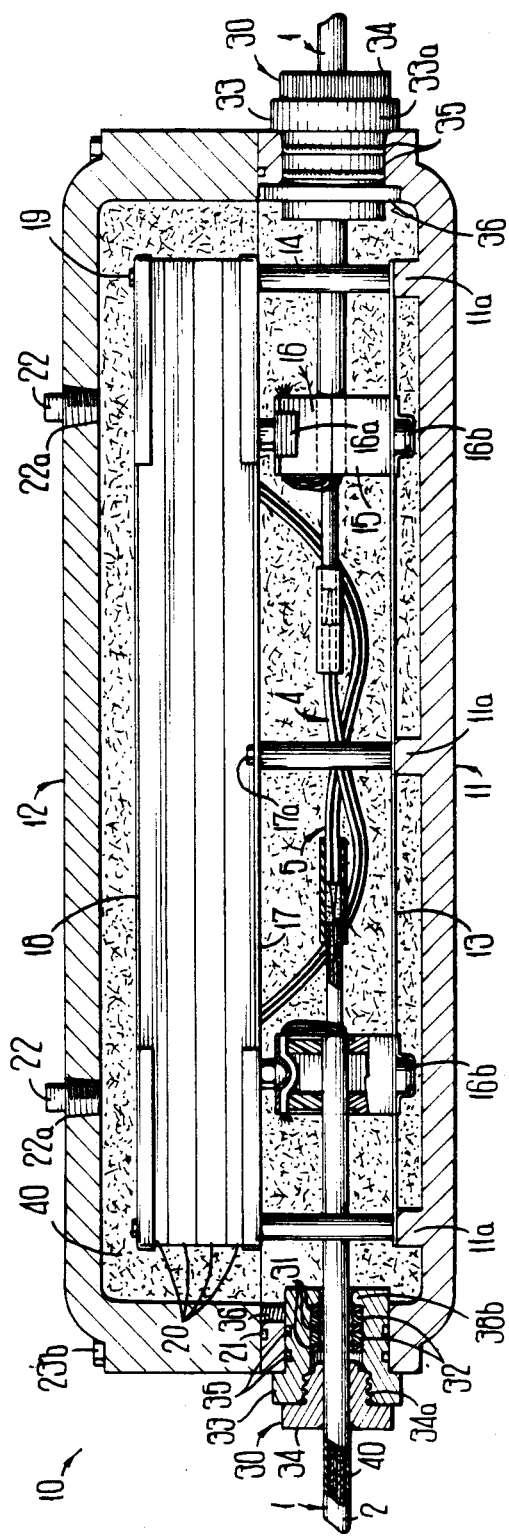
FIG. 3: is a side view showing cross-sectional details of the end seal assembly and the cable grip devices of the closure.

The two end-seal assemblies 30, seen in FIG. 2, each consist of a cable insert 33 which fits through entrance 8 of the two opposite end portions lower housing; and a cable locking nut 34 with a threaded collar 34a that screws into the entrance 39 of insert 33. The exterior surface of 33b of insert 33 mounts two O-ring seals denoted 35 which, as seen in FIG. 3, provide a watertight seal between the lower housing 11 and the cable insert 33. The interior of insert 33 comprises an axial passage 38 for receiving a cable, and an internal end flange 38b. Two cable jacket O-rings 32 contained in three back-up rings 31 mount in the interior of the entrance passage 38 of cable insert 33. This O-ring set provides a watertight seal between the outer jacket 2 of the cable sections 1, and the passage 38.

The insert 33 is formed with two key slots 37. A U-shaped retaining key 36 engages the slots 37 to anchor the cable insert 33 and the nut 34 onto the lower half 11 of the closure 10. The main mechanical connection of the cable sections to the closure is provided by two cable grip assemblies, each consisting of a lower grip block 15 and an upper grip block 16, seen in FIGS. 2 and 3. Each of these assemblies is mounted using a retainer cap 16a and two bolts denoted 16b, which fasten onto a metal plate 13. Plate 13 is anchored on mounting feet 11a cast into the lower half 11 by items 14. The splice tray assembly is anchored in a manner to be described.

To facilitate the splicing of optical fibers of the fiber groups 4, 5, the invention provides a plurality of spaced organizer trays 20 disposed in the interior of upper half 12, as seen in FIG. 3. The trays 20 are contained between a tray support 17 and a tray cover 18. Tray support 17 is equipped with four holes 17b which accommodate or provide access to the ends of the fasteners 16b of the cable grip assembly. Six standoffs, each denoted 14 and having a threaded blind hole 14a, serve to mount the tray support 17 and also to space the trays a predetermined distance beyond the cable grips assembly of blocks 15, 16. As seen in FIG. 2, fasteners 17a are treaded into the two middle standoffs and secure item 17 to the respective two standoffs 14. Four longer fasteners, denoted 19, pass through splice tray assembly and thread into standoffs 14, and thereby rigidly retain the trays and covers in spaced relation once the splice is completed.

Advantageously, to assure against the incursion of water or other contaminants into the closure interior, conventional optical fiber closure fill 40, shown in FIG. 3, is introduced through access ways 22a into the closure 10, once the splices are made and the trays are secured. The access ways are then plugged as shown. The use of fill in conjunction with similar fill in the interior of cable 1, provides a pressure equalization mechanism between the closure interior and the cable interior which operates independent of deployment depth. Pressure equalization helps to avoid creating pressure differentials which would compromise the watertight character of the closure.

Many variations on the inventive concepts described above will be readily apparent to those skilled in the art; and all of these are embraced in the scope of the claims to follow.

We claim:

1. A cable splice closure comprising:
   an upper housing;
   a lower housing having end portions comprising:
      circular cable entrances to the lower housing interior;
      and a plurality of fixed mounting means extending from the surface of said lower housing interior;
   an end-seal assembly for introducing a cable into said lower housing interior and sealing each of said entrances, each said assembly comprising:
      insert means having an axial passage and an exterior surface extending through said lower housing entrance;
      first sealing means disposed on said exterior surface and contacting said lower housing entrance;
      second sealing means for contacting a cable contained in said passage;
      locking means mounted into said passage and having an axial passage and an interior end, for compressing said second sealing means onto a cable; and
      retaining means engaging said insert means exterior surface and said lower housing end portions;
   means secured to said lower housing fixed mounting means for containing in layered relation a plurality of splices; and
   means for anchoring to the interior floor mounting means for housing, respective ends of a cable extending through said insert means axial passage.

2. A cable splice closure in accordance with claim 1, wherein said upper housing includes:
   access ways for introducing fill to the interior of said closure; and
   means for plugging said access ways.

3. A cable splice closure in accordance with claim 2, wherein said containing means comprises:
   top and bottom members;
   a plurality of trays disposed there-between for holding plural splices; and wherein said closure further includes:
   means for locating said containing means substantially into the interior of said upper housing.

4. A closure in accordance with claim 3, wherein said first sealing means comprises:
   a plurality of first O-ring seals; and
   a like plurality of circular grooves in said exterior surface for receiving said first O-ring seals.

5. A closure in accordance with claim 4, wherein said second second sealing means comprises:
   a plurality of second O-ring seals; and
   a plurality of non-metallic backup rings spaced between and containing said second O-ring seals;
   and wherein said axial passage of said insert means includes an internal end flange;
   the innermost said backup ring seating on the internal end flange of said axial passage; and
   the outermost said backup ring contacting said interior end of said locking means.

6. A cable closure in accordance with claim 1, wherein said insert means exterior surface comprises:
   two parallel slots formed on opposite sides of said surface and to the interior side of said first sealing means; and said retaining means comprises:
   a U-shaped key engaging in said two slots.

* * * * *